Figure 1:
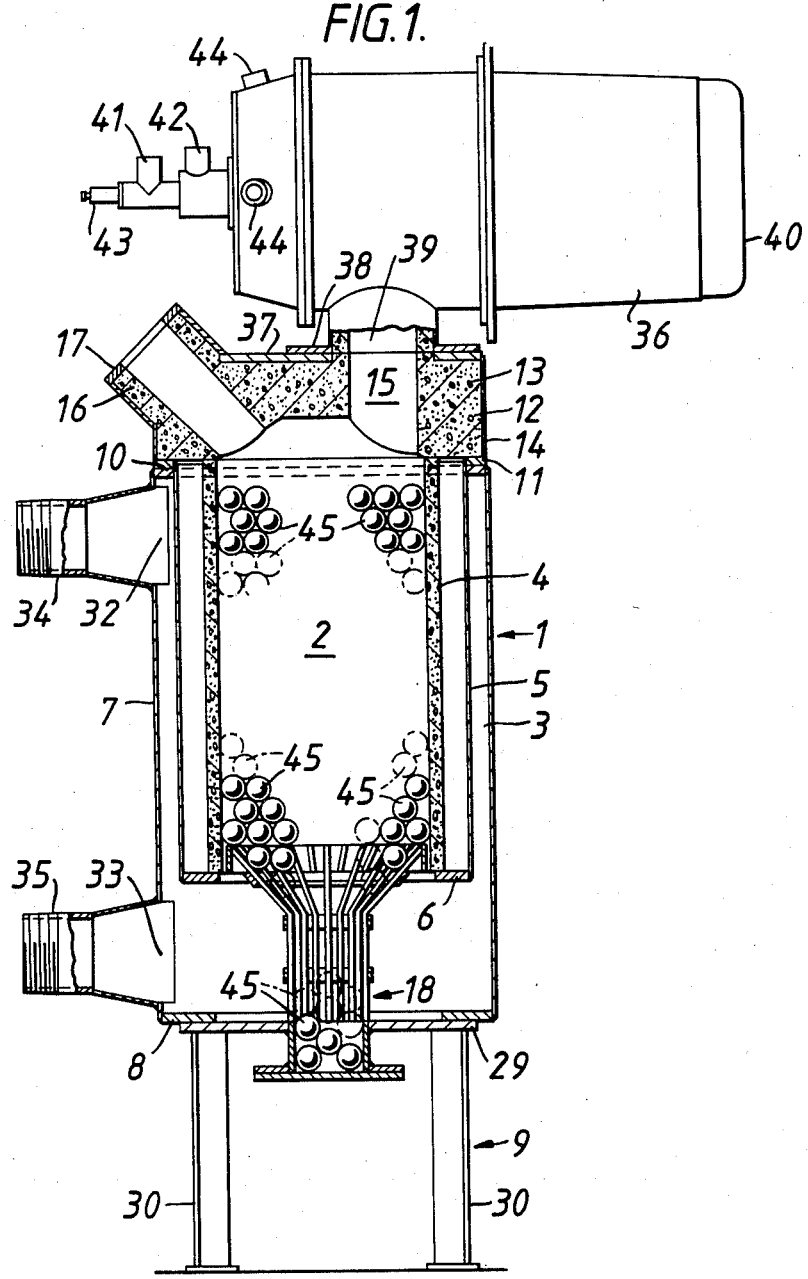

United States Patent [19]

Ward

[11] Patent Number: 4,807,695
[45] Date of Patent: Feb. 28, 1989

[54] REGENERATOR FOR A REGENERATIVE HEATING SYSTEM

[75] Inventor: Trevor Ward, Kirby Moreside, England

[73] Assignees: British Gas plc, London; Hotwork Developments Ltd., Dewsbury, both of England

[21] Appl. No.: 204,921

[22] Filed: Jun. 9, 1988

Related U.S. Application Data

[63] Continuation of Ser. No. 928,031, Nov. 7, 1986, abandoned.

[51] Int. Cl.⁴ ............................................. F28D 17/00
[52] U.S. Cl. .......................................... 165/4; 165/10; 431/215; 431/240; 432/28; 432/180; 432/181
[58] Field of Search ................ 165/4, 10; 431/7, 170, 431/215, 240, 233, 234; 432/28, 180, 182, 181

[56] References Cited

U.S. PATENT DOCUMENTS 1,940,371 12/1933 Royster .
2,272,108 2/1942 Bradley ................................. 165/4
4,398,590 8/1983 Leroy .................................. 432/180
4,522,588 6/1985 Todd et al. ......................... 431/215
4,730,599 3/1988 Kendall et al. ..................... 431/215

FOREIGN PATENT DOCUMENTS 666667 5/1931 Fed. Rep. of Germany .
1576517 8/1969 France .
628437 8/1949 United Kingdom .
749464 5/1956 United Kingdom .
1243185 8/1971 United Kingdom .

Primary Examiner—Albert W. Davis, Jr.
Attorney, Agent, or Firm—Oblon, Fisher, Spivak, McClelland & Maier

[57] ABSTRACT

A regenerator for a regenerative heating system comprises a chamber 2 for storing a heat storage bed in the form of discrete particles 45, a closable inlet 16 for introducing fresh particles into the chamber 2 to replace contaminated particles and a closable outlet 18 for removing the contaminated particles from the chamber 2 so that the fresh particles may be introduced.

2 Claims, 2 Drawing Sheets

REGENERATOR FOR A REGENERATIVE HEATING SYSTEM

This application is a continuation of Ser. No. 928,031, filed on Nov. 7, 1986, now abandoned.

The present invention relates to a regenerator for a regenerative heating system.

Around 50% of the fuel gas used in high temperature processes is used in plant producing dirty waste gas. Such processes include glass smelting and the melting of non-ferrous metals. These waste gases may include solid, unreacted contaminated material resulting from the charge being processed or other contaminants in the form of vapour phase compounds which condense as the waste gas is cooled.

Although these waste gases are a far from ideal source of recoverable heat for the preheating of combustion air for the fuel gas, attempts have been made to harness their potential for the preheat of combustion air utilising conventional regenerative heating systems.

Small scale heat recovery systems such as recuperative burners have in general been unsuitable as heat recovery systems because of the tendency for the flue (waste) gas passages in these burners to become blocked with the material carried over with the flue gases. In addition, many of the contaminants are highly corrosive to the metals from which the recuperative burners are made.

On the other hand, when regenerative heating systems using conventional regenerators have been used to extract the waste heat from the waste gases, the heat storage beds through which the gases pass have required extensive cleaning and maintenance after use due to their contamination and blockage by the waste gas contaminants.

It is therefore an object of the present invention to provide a regenerator for a regenerative heating system in which these problems are overcome.

According therefore to the present invention, a regenerator is provided for a regenerative heating system, the regenerator comprising a chamber for storing a heat storage bed in the form of discrete particles, a closable inlet for introducing fresh particles into the chamber to replace contaminated particles and a closable outlet for removing the contaminated particles from the chamber so that the fresh particles may be introduced.

Figure 2:
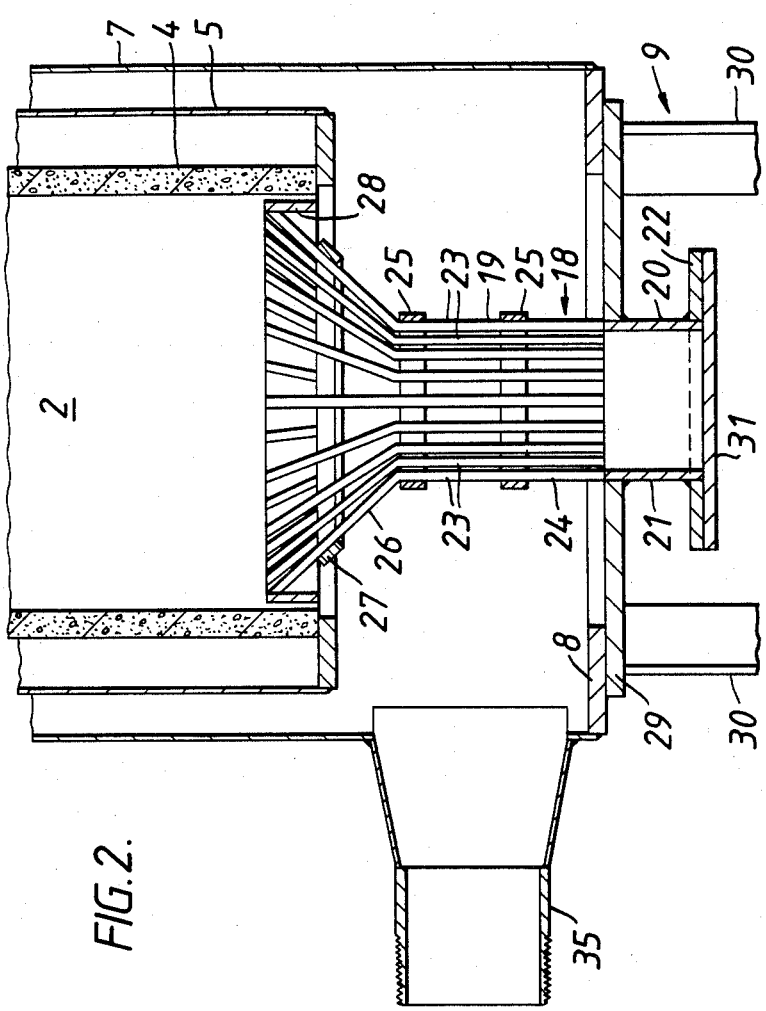

An embodiment of the invention will now be particularly described with reference to the accompanying drawings in which:

FIG. 1 shows a side view in section of a regenerator in accordance with the present invention and FIG. 2 shows in close up a side view in section of the lower part of the regenerator shown in FIG. 1.

Referring to the drawings, the regenerator 1 comprises an inner chamber 2 for storing a heat storage bed and an outer chamber 3 surrounding the inner chamber 2.

The inner chamber 2 is formed within a cylindrical shell 4 formed of insulating material of refractory or ceramic fiber which itself is surrounded with clearance by a cylindrical metal shell 5, the shell 4 serving as an insulating lining for the metal shell 5.

The lining rests upon an inwardly directed annular metal member 6 secured to the lower end of the shell 5 as shown in the drawings.

The outer chamber 3 is formed by the clearance space between the metal shell 5 and an outer generally cylindrical metal shell 7.

The outer shell 7 is provided at its lowermost end with an inwardly directed annular metal member 8 which is secured to the shell 7 and which rests upon a platform 9. The platform 9 supports the regenerator 1 off the ground.

The uppermost end of the outer shell 7 is also provided with an inwardly directed annular metal member 10 which is secured to the shell 7 and serves as a support for the inner metal shell 5. To this end the uppermost end of the inner metal shell 5 is provided with an outwardly directed annular metal member 11 which is secured to the inner metal shell 5 and rests upon the member 10.

In effect therefore, the lining 4 is supported on the inner shell 5. This in turn is supported on the outer shell 7 which is supported on the platform 9.

The upper end of the regenerator 1 comprises a cover 12 which rests upon the member 11 and the topmost edge of the lining 4, the cover 12 being suitably secured to these components. The cover 12 is generally circular in shape and comprises an interior formed of an insulating material of ceramic or refractory fibre 13 housed in a surrounding metal shell 14. The cover 12 is provided with a vertically extending opening 15 which serves in one mode of operation of the regenerator 1 as an outlet for the discharge of combustion air preheated in the regenerator and in the reverse mode of operation as an inlet for waste gas for heating the regenerator 1 as will be appreciated by those versed in the art. The cover 12 is also provided with another opening 16 which serves as an inlet port for the introduction of heat storage particles into the chamber 2 formed by the lining 4. It will be seen that for obvious reasons the openings 15 and 16 lead directly into the chamber 2. The opening 16 is closed by means of a releasable sight glass 17 of suitably reinforced and heat resistance material.

The lowermost end of the chamber 2 is closed by a closure assembly 18 shown in detail in FIG. 2 and serving to support the bottom end of the heat storage bed. The assembly 18 comprises an uppermost portion in the form of a metal cage 19 and a lowermost portion 20 comprising a cylindrical metal ring 21 secured to the lower edge of the cage 19, and provided at its lowermost end with a circular flange 22.

The cage 19 comprises a number of spaced metal bars 23 forming a structure in the shape of a champagne glass. The portions of the bars 23 forming the "stem" 24 of the cage are held together by two spaced metal hoops 25 while the portions of the bars 23 forming the fluted uppermost part 26 of the cage are held together by a metal hoop 27 suitably shaped for the purpose. The fluted part 26 of the cage 19 extands inwardly into the lowermost end of the chamber 2 and terminates close to the inner wall of the lining 4. An annular plate 28 is secured to the edge of the fluted part 26 of the cage 19 to serve as a barrier to the escape of heat storage particles between the cage 19 and the lining 4.

The platform 9 comprises a stage in the form of an apertured metal plate 29 which is supported upon four metal legs 30 (only two shown in the drawings) of angled section. The uppermost portion of the metal ring 21 of the closure assembly 18 is located within the aperture in the plate 29 and is secured to the plate 29 so that in effect the closure assembly 18 is supported on the platform 9.

The lowermost end of the ring 21 is closed by a releasable circular plate 31 which is bolted by releasable bolts (not shown) to the flange 22.

The spaces between the bars 23 in the cage 19 permit the combustion air to enter the chamber 2 and waste gas to leave it as conventional.

Referring to FIG. 1, the outer metal shell 7 is provided with two openings 32 and 33 which respectively serve as an inlet to provide combustion air for preheating in the chamber 2 and as an outlet for discharging waste gas from the regenerator after its passage through the chamber 2 to heat up to reheat the heat storage bed. It will be appreciated that when the inlet 32 is supplying the combustion air the outlet 33 is closed and similarly when the outlet 33 is discharging waste gas the inlet 32 is closed. The inlet and outlet are respectively formed by two externally threaded stub pipes 34 and 35 secured to the shell 7. The inlet pipe 34 may be connected to a suitable source of combustion air while the outlet pipe 35 may be connected to a flue.

The opening 15 in the cover 12 communicates with a regenerative burner 36 of the type which is disclosed in our copending UK patent application No. 8306795. To this end the cover 12 is provided with an apertured metal plate 37 with the portion of the cover 12 forming the opening 13 projecting through the aperture in the plate 37. This plate 37 is secured to a plate 38 forming a flange in a corresponding opening 39 in the burner 36. The opening 39 in the burner 36 serves in one mode of operation of the regenerator 1 as an outlet for discharging waste gas which has entered the burner 36 through its forward end 40 from a furnace or like enclosure (not shown) and in the reverse mode of operation as an inlet for receiving from the regenerator 1 the combustion air preheated in the regenerator 1. The burner 36 is provided with a fuel gas inlet 41 by means of which the fuel gas can be introduced into the burner 36 for mixing with the preheated combustion air in the burner 36 before discharge as combusted gas from the forward end 40 of the burner 36 into the furnace or enclosure to which the burner 36 is connected. The burner 36 is also provided with a pilot air inlet 42 for purposes which are fully described in our copending UK patent application No. 8306795 together with a spark probe 43 for ignition purposes and flame detection sight ports 44.

The heat storage bed itself comprises small discrete particles of any suitable shape and insulating material. In FIG. 1 the bed particles are in the form of small ceramic spheres 45. These are introduced into the chamber 2 through the inlet port 16 at the top of the regenerator 1, the sight glass 17 being removed for the purpose and then replaced after sufficient particles have been introduced. Contaminated particles may be run out through the closure assembly 18 at the bottom of the regenerator 1 by removing the plate 31, the plate 31 being replaced before fresh particles are introduced into the chamber 2. In this way if the heat storage bed becomes blocked due to the build up of charge contaminants carried by the waste gas, the bed can be removed and replaced with fresh material.

Depending on the type and amount of contaminant carried over in the waste gas, this operation can be carried out intermittenly or continuously. The heat storage particles can also in some circumstances be cleaned and re-used. By automating this discharge/recharge process there is no need for any manual cleaning of the regenerator as is commonly required when conventional regenerators are used. In addition the discharge/recharge process can be carried out whilst the charge is being heated and therefore maintenance downtime is reduced.

The inner shell 5 and lining 4 are air cooled during the air preheating cycle and this is beneficial in extending the overall life of the lining 4.

I claim:

1. A regenerator for a regenerative heating system comprising:
    an inner imperforate chamber for storing a heat storage bed in the form of discrete particles, a closable inlet for introducing fresh particles into the inner chamber to replace contaminated particles;
    a closable outlet for removing the contaminated particles from the inner chamber so that the fresh particles may be introduced;
    an outer chamber surrounding the inner chamber and serving to receive waste gas from the inner chamber after passage through the inner chamber or to supply air for heating in the inner chamber, the outer chamber serving either to discharge the waste gas from the regenerator or to receive air for heating in the regenerator; and
    a closure assembly extending from said inner chamber through said outer chamber to said closable outlet, said closure assembly comprising a funnel-shaped cage portion tapered towards said closable outlet and a connecting cage portion connected between a tapered end of said funnel-shaped cage portion and said closure outlet, said closure assembly containing a portion of said heat storage bed and providing communication between said inner and outer chambers.

2. A regenerator as claimed in claim 1 in which the outer chamber has an outlet to discharge the waste gas and an inlet to receive air for heating.

* * * * *